Patented July 11, 1939

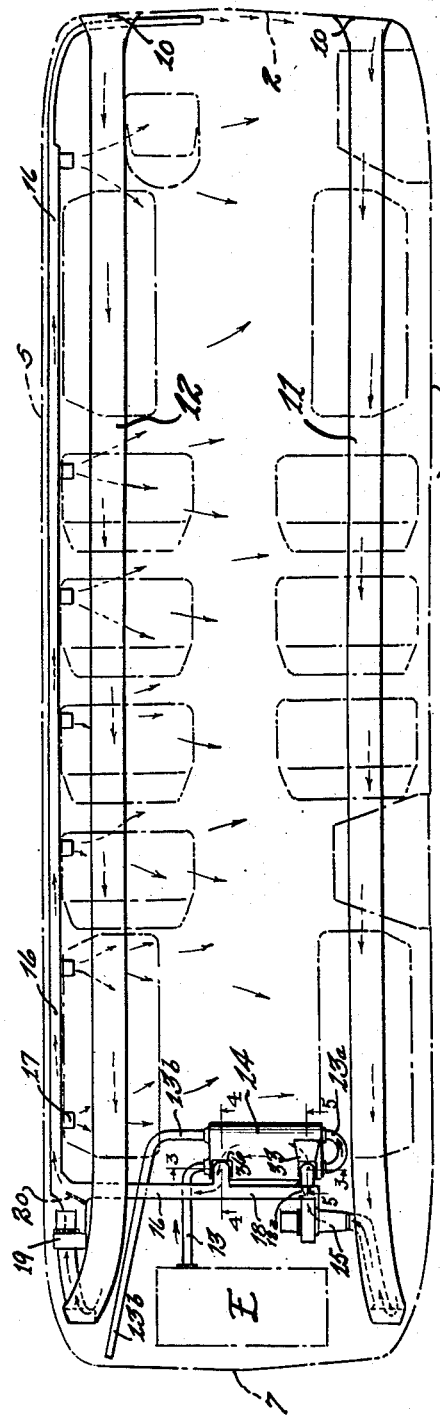

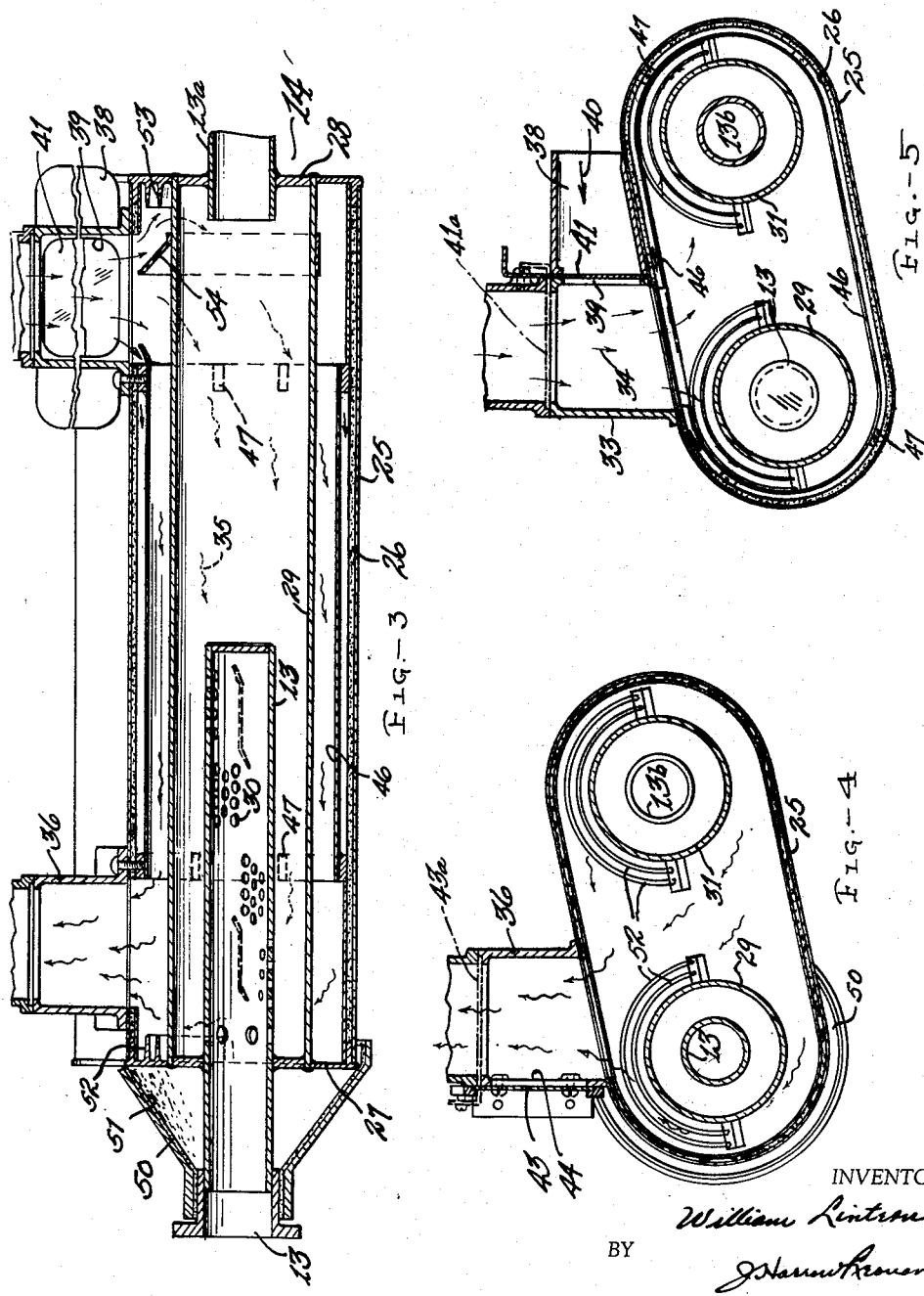

2,165,559

UNITED STATES PATENT OFFICE 2,165,559

VEHICLE BODY VENTILATION SYSTEM AND APPARATUS

William Lintern, Cleveland, Ohio, assignor, by mesne assignments, to Evans Products Company, Detroit, Mich.

Application January 9, 1936, Serial No. 58,350

4 Claims. (Cl. 237—12.3)

This invention relates to vehicle body heating and ventilating, one of the principal objects being to introduce into the body an adequate supply of fresh outside air from a clean source uncontaminated by exhaust fumes and the like from the vehicle, both while the vehicle is in motion and while stopped.

Another object is to moderate the temperature of the stream of heated air discharged into the body preparatory to discharge so that localized hot and cold currents are eliminated and the heat is diffused uniformly throughout the body.

A more specific object is to insure proper heating of the front of the body from a heater located at the rear thereof and to apply the heated air onto the windshield of the body in such a manner that accumulation of snow, ice and the like on the windshield is eliminated.

Another specific object is to effect a circulation of air throughout the body with minimum power requirements and to render useful for heating purposes a greater percentage of the heat of the engine exhaust gases.

A correlative object is to effect recuperation of the exhaust gas heat by means of an improved exhaust gas heater.

More general objects are to provide a heating and ventilating system in which air is both injected into the body and ejected therefrom after circulation therethrough, the air during injection, being heated or not, as desired, and to effect these results by means of equipment which may be readily incorporated into the body without utilizing space which would otherwise be useful within the body compartment.

Other objects and advantages will become apparent from the following specification wherein reference is made to the drawings in which Fig. 1 is a diagrammatic top plan view of a passenger coach body with the apparatus of the present invention installed therein;

Fig. 2 is a side elevation of the apparatus illustrated in Fig. 1, the vehicle body being designated in dot and dash lines to indicate the relative position of the apparatus therein; and Figs. 3, 4 and 5 are sectional views of the exhaust heater and adjacent equipment illustrated in Figs. 1 and 2 and are taken on planes indicated by the line 3—3, 4—4 and 5—5 respectively of Fig. 1.

Referring to the drawings, the apparatus is shown installed in a body 1, designated by a dot-dash line in Figs. 1 and 2, the body having a front wall 2 with a transparent windshield 3 incorporated therein and side walls 4 and 5, the body compartment being completed by the top wall 6 and rear wall 7.

As described in United States Letters Patent Nos. 1,862,058, issued June 7, 1932, 1,961,978 issued June 5, 1934, 1,958,056, issued May 8, 1934, and 1,969,935, issued Aug. 14, 1934, means are provided for removing vitiated air from the interior of the body, these means herein cooperating with the air injection and heating apparatus for insuring circulation of air at the desired temperature. For this purpose, suitable ejector openings 8, such as described in the above patents, are provided at the front of the body in a position to open into a low pressure zone created by the confluence of the relatively onrushing air above the body occasioned by forward movement of the body and the air deflected upwardly by the front wall, as indicated by the arrows a. This zone extends rearwardly over the forward portion of the top wall 6 from just behind the limit of the front wall 2. The ejector openings 8 are in communication with a header 9 which, in turn, may be in communication with the interior of the body at any desired location as described in the above Letters Patent, but preferably near the front and top wall level. Thus the general flow of air from the body is from the floor upwardly and forwardly as indicated by the arrows b, this air being discharged into the outside air, as indicated by the arrow c. The ejector openings 8 are preferably at the center forward portion of the top wall 6, as illustrated.

In order to introduce air into the body, injector means, also described in the above Letters Patent, may be provided, the injector means having openings 10 in the front wall or near or at the juncture of the front wall and top wall. The openings 10 preferably open forwardly into the path of the relatively onrushing air so that air is forced in due to the forward motion of the vehicle body and are arranged above the level of the windshield, one at each side of the ejector openings. Leading from the openings 10 are longitudinally extending air inlet ducts 11 and 12, each duct being to a different one of the openings 10. The ducts 11 and 12 extend along the lateral margins of the top wall from the front to the rear of the body as illustrated in Figs. 1 and 2 and at the rear of the body extend downwardly along the rear wall 7.

The body illustrated is one in which a rear end engine E is provided, the engine having an exhaust pipe 13 leading to an exhaust gas heater 14 which is preferably located at the rear end of the body closely adjacent the engine so as to reduce losses of heat from the exhaust pipe 13 before reception thereof in the heater 14.

In the form illustrated, the heater 14 is a double unit type, both units being identical and included in the same casing, as will be more fully described hereinafter. The exhaust gases enter the heater through the pipe 13, pass through the first unit and then into the second unit through the pipe 13a. From the second unit, the gases are exhausted to the outside air through the pipe 13b, all as will be more fully described hereinafter.

As explained above, it is desirable that the air be supplied in the body from a source which is uncontaminated by exhaust gases and the like while the vehicle body is standing idle as well as while in motion. Experience has proven that at one zone only can such air be obtained, under both conditions, and this zone is at the forward portion of the body near the top and front walls. Other zones are adversely affected upon stopping the vehicle by the forward surge of the back-dragging air and fumes trailing the body, and by side wind currents, and the like. The air injected into the duct 11 therefore is as clean as can be obtained without special treatment of the air itself.

This air is conducted through the duct 11 to the inlet of a blower 15 from which it is forced into the heating compartment of the heater 14. A distribution duct 16 is connected to the outlet of the heater 14 and extends into the body, preferably extending from the rear of the body, along the side wall 5, to the front end of the body. Suitable grill covered ports 17 are provided at desired points along the duct 16 to insure as even distribution of air as possible in the body. In addition, there is connected with the discharge of the blower 15, a by-pass duct 18 which is controlled by a suitable valve 18a, as described in my copending application, Serial No. 1,915, filed Jan. 15, 1935, so that all or part of the air from the blower 15 may be passed through the heater 14 or, if desired, as in the warmer seasons, may be by-passed around the heater and directly to the duct 16. The other duct 12 leads to a blower 19 which discharges directly into the distribution duct 16 beyond the heater for moderating the more intensely heated air issuing from the heater preparatory to its discharge into the vehicle body. The blower 19 is operable independently of the blower 15 and the amount of additional air supplied thereby and from the duct 12 may be regulated by a suitable valve 20 at the juncture of the discharge of the blower 19 with the distribution duct 16.

A duct 80 communicates with the duct 16 at the forward end thereof and extends upwardly toward and inwardly along the lower edge of the windshield. An outlet opening is provided in the duct 80 so that the warmed air issuing therefrom is directed upwardly along the inner face of the windshield as indicated by the arrows 82.

Several advantages are obtained by the structure recited. In the first place the power required for operating the blowers 15 and 19 is greatly reduced due to the fact that the air supplied by the ducts 11 and 12 to the inlets of the blowers is under considerable pressure and further, due to the fact that the ejector 8 tends to prevent back pressure within the body in an amount sufficient to greatly affect the discharge of the blowers. However, sufficient back pressure is maintained so that the pressure of the air within the body is slightly in excess of that of the outside atmosphere so that infiltration of exhaust gases and cold air is eliminated.

When the vehicle is moving forwardly, adequate air may be supplied without the blowers or with the blowers running at very low speed. Thus the blowers can be operated, if desired, only when the vehicle is moving at relatively slow speed or is stopped. In no event do the exhaust gases from the vehicle contaminate the air at the inlets of the ducts 11 and 12, as the surge of the gases and air drawn along by the moving vehicle does not reach the forward portion of the body when the vehicle stops. In event of tailwinds and the like tending to reduce the effect of the natural air injection, the blowers can be operated for insuring an adequate supply.

Referring next to the particular heater used, which is illustrated in Figs. 3 to 5 inclusive, the heater comprises an outer casing 25 having an inner liner of asbestos or other heat insulating material 26. The ends of the casing 25 are closed by suitable metal headers 27 and 28 which may be of cast iron or other heat conducting material. Within the casing 25, in spaced relation to the walls thereof, is a sleeve or conduit 29 mounted at its ends in the headers 27 and 28 and sealed therein so as to prevent passage of gases from the interior of the sleeve 29 into the annular compartment defined by the sleeve, the casing 26 and the heads 27 and 28. The exhaust pipe 13 from the engine E discharges into the interior of the sleeve 29 at one end and terminates part way of the length of the sleeve, a number of groups of ports 30 being provided for distributing the exhaust gases from the pipe 13 along a portion of the sleeve 29.

At the opposite end of the sleeve is a pipe 13a which forms, in effect, a continuation of the exhaust pipe of the engine and leads into the opposite unit of the heater which includes a sleeve 31, corresponding in form and effect to the sleeve 29. From the opposite end of the sleeve 31, the continuation 13b of the exhaust pipe extends and discharges into the outside atmosphere.

At the end of the casing 25, remote from the pipe 13, is an inlet header 33 through which air from the blower 15 is discharged into the heating compartment of the heater 14, as indicated by the arrows 34. This air flows lengthwise of the heater, as indicated by the arrows 35, and is discharged therefrom through a header 36 which leads to the distribution duct 16.

In general practice, the heaters are installed on the vehicle bodies permanently. Consequently, in the warmer seasons, when the air is not to be heated, it may be by-passed through the duct 18. When the air is by-passed in this manner for long periods, as during the summer season, no means have heretofore been provided for removing heat from the heating compartment of the heater with the result that extremely high temperatures are created therein, which, when long continued, have caused scaling and other deterioration of the component parts. In order to remove this heat and maintain a safe temperature during these periods, the inlet header 33 is provided with wings 38 which flare apart forwardly of the vehicle and direct onrushing air through a suitable opening 39 in the header into the heating compartment so that outside air from any source desired may be passed into the heater, as indicated by the arrow 40. In those instances in which an excess capacity is provided by the duct 11 and blower 15, part of this air may be utilized for this purpose.

For controlling this operation, a suitable slide damper 41 is provided, and is positioned, as indicated in Fig. 5, to block the opening 39 when it is desired to utilize the heater. The damper 41 may be removed therefrom and positioned, as indicated at 41a, to block the outlet of the blower 15 relative to the heater when the heater is not to be used for an interval. A corresponding damper 43 is provided in the discharge header 36 which header is provided with an opening 44. The opening 44 faces rearwardly of the body so that a low pressure air zone is created about the opening 44 for insuring an adequate flow of air through the heater and into the outside atmosphere when the heat is not being used for heating the body. The damper 43 may likewise be utilized to close the discharge passage of the heater, as indicated at 43a, which leads to the interior of the body when the damper is not positioned for closing the opening 44.

When it is desired to use part of the air from the duct 11 for removing heat from the heater when the heater is not in use, the damper 43 may be positioned in the dot and dash position 43a, illustrated in Fig. 4, in which case the opening 44 is open and air from the blower 15 passes through the heater to the outside air. Under these latter circumstances, the damper 41 is positioned to block or partially block the opening 39, depending on the amount of air to be passed through the heater. When the damper 41 is positioned to block the opening 39 entirely, the proportion of the air from the blower which is passed through the heat is controlled by the control valve 18a of the by-pass duct 18, above referred to.

As the air flows through the heater from the header 33 to the header 36, it is desirable to utilize part of this air for preventing the intense heat from the sleeve 29 from radiating to the outer casing 25. Consequently a sleeve 46 is provided and extends from the adjacent edge of the header 33 to the adjacent edge of the header 36, being supported in place on suitable spaced pads 47 so that air may flow between the sleeve 46 and the casing 25 or insulating packing 26. Thus the larger potion of the air passing through the heater passes between the sleeve 29 and sleeve 46 and is exposed close to and confined closely about the intensely heated sleeve 29. A part of the air, however, passes between the sleeve 46 and outer casing and thus forms an insulating and recuperating air stream for reducing radiation losses which would be occasioned were no such sleeve interposed between the sleeve 46 and the sleeve 29. This heat received in this air stream is not lost but passed on into the air being discharged from the heater.

In operation it has been found that a considerable loss of heat is occasioned at the ends of the heater due to the large volume of cold outside air which is constantly blown over the exhaust pipe portions 13 and 13a. Since this cold air is constantly displaced, the maximum differential in temperature between the exhaust pipe, the headers 27 and 28, and the outside air is present at all times during operation of the vehicle. Furthermore, since the headers 27 and 28 are of heat conducting material and must be usually of metal, a large amount of heat is transferred from the pipes 13 and 13a by direct metal to metal conduction, resulting in a much larger surface exposed to the rapidly passing outside air currents. This heat likewise is passed by metal to metal conduction to the outer casing 25, thus creating undesirable heating thereof and additional heat losses into the outside air. In order to utilize this heat to advantage and prevent these undesirable effects, a heat insulating metal shield 50, having a heat insulating lining 51 is mounted on the pipe 13 and flares outwardly from the pipe to the end of the heater 14 so as to form a substantially dead air pocket at the end of the heater. Such shields may be provided at both ends of the heater. This prevents the rapid passage of outside air over and in contact with the pipes 13 and 13a so that the heat is not dissipated therefrom. However, as a result of this, the headers 27 and 28 of the casing are heated to an additionally high temperature and differentials in expansion and contraction may adversely affect the heater. For eliminating these undesirable effects and at the same time utilizing the heat which would otherwise be lost in creating them, the headers 27 and 28 are provided with sets of radiating fins 52 and 53 respectively. The fins are preferably thin metal integral with the end walls and extend inwardly into the heating compartment of the heater. The fins 52 and 53 are formed to provide as much surface area as possible commensurate with an adequate flow of air thereacross.

Referring first to the fins 52, the same extend longitudinally of the sleeve 29 and only about half way down from the top of the heater, as better illustrated in Fig. 4 so that air may readily pass onto them and conduct away the heat. Thus the heat in the header 27 is conducted rapidly into the fins and discharged thereby into the air which passes into the body. The fins 53 are correspondingly arranged. In those instances in which the air entering the header 33 passes the fins without coming in contact therewith, a semi-annular baffle 54 is provided for deflecting part of the air entering the header 33 longitudinally of the heater and directly onto the fins. Thus the heat conducted into the header 28, instead of being conducted outwardly to the casing or dissipated into the outside air, is conducted into the interior and discharged into the air stream utilized for heating the interior of the vehicle body. The baffle 54 is preferably fastened in firm contact with the sleeve 29 so that heat may be conducted from the sleeve thereby and additional surface for radiating this heat into the air within the heater is provided.

The blowers 15 and 19 are operated by the usual electric motors connected to the battery of the vehicle, the customary switches for each being provided within easy reach of the driver's seat so that the desired effects may be obtained readily.

It is apparent from the foregoing that a system and structure suitable for use under substantially all conditions of weather and temperature and assuring fresh air at the proper temperature and durability is provided.

Having thus described my invention, I claim:

1. In a vehicle body having a front wall including a transparent windshield, a top wall and side walls extending rearwardly therefrom, air injector means opening at the front wall above the windshield into the relatively onrushing outside air stream occasioned by forward movement of the vehicle body, a heater for the body, an air inlet duct connecting the injector means and heater, an air distribution duct leading from the heater and opening into the body, a second air inlet duct connected to the injector means and opening into the distribution duct beyond the heater, separate blowers for said inlet ducts, said blowers, having their respective inlets connected each to a different one of said inlet ducts one blower having its outlet connected with the heater, and the other blower having its outlet connected with the distribution conduit.

2. In a vehicle body having a rear wall, a front wall including a transparent windshield, a top wall and side walls extending rearwardly from the front wall, air injectors having openings at the front wall above the windshield and positioned one injector near each lateral margin of the body in the path of air sweeping upwardly over said windshield, air inlet ducts in the body connected one to each injector, each duct extending from the associated injector rearwardly of the body along and close to the juncture of the top wall and corresponding side wall to and along the rear wall, distribution duct means in the body near the floor thereof extending from the rear of the body forwardly along one side wall and having openings into the body, means connecting both inlet ducts with said distribution duct means, and a heater operatively interposed between one of said inlet ducts and said distribution duct means.

3. In a vehicle including a body and engine, an exhaust heater connected to the exhaust pipe of the engine, an air inlet duct opening into the atmosphere at the forward portion of the body and connected to the heater for admitting air thereto, a discharge duct connected to the heater and opening into the interior of the body, a by-pass duct connected with the inlet duct in advance of the heater and to the discharge duct beyond the heater means associated with the by-pass duct for disconnecting the heater from the inlet duct and discharge duct and connecting the inlet duct and discharge duct with each other through the by-pass duct, and means for admitting air into said heater independently of the inlet duct, and an additional discharge duct connected to the heater and opening into the outside atmosphere whereby, during the by-passing operation, a flow of air is maintained through the heater to prevent overheating of the same.

4. In a vehicle body having a front wall including a transparent windshield, a top wall and side walls extending rearwardly from the front wall, a heater near the rear of the body, means to admit outside air into the heater, an air distribution duct leading from the heater into the body and extending forwardly of the body near a side wall thereof, said duct having air discharge vents in spaced relation lengthwise thereof, the forward end portion of said duct extending along a portion of the front wall of the body beneath the windshield level and having an opening directed for discharging heated air upwardly along the inner surface of the windshield.

WILLIAM LINTERN.